(12) United States Patent
Yan et al.

(10) Patent No.: US 11,488,790 B2
(45) Date of Patent: Nov. 1, 2022

(54) SWITCH DEVICE

(71) Applicant: ABB Schweiz AG, Baden (CH)

(72) Inventors: Congming Yan, Xiamen (CN); Xingjie Chen, Xiamen (CN); Liqun Huang, Xiamen (CN); Huihuang Yang, Xiamen (CN); Ziying Xiao, Xiamen (CN)

(73) Assignee: ABB SCHWEIZ AG, Baden (CH)

( * ) Notice: Subject to any disclaimer, the term of this patent is extended or adjusted under 35 U.S.C. 154(b) by 38 days.

(21) Appl. No.: 17/172,157

(22) Filed: Feb. 10, 2021

(65) Prior Publication Data
US 2022/0172908 A1 Jun. 2, 2022

(30) Foreign Application Priority Data

Nov. 30, 2020 (CN) .......................... 202011378356.0

(51) Int. Cl.
*H01H 9/26* (2006.01)
*H01H 71/02* (2006.01)
(Continued)

(52) U.S. Cl.
CPC .............. *H01H 9/26* (2013.01); *H01H 71/02* (2013.01); *H01H 71/1009* (2013.01); *H02B 11/133* (2013.01); *H02H 7/22* (2013.01)

(58) Field of Classification Search
CPC ...... H01H 9/26; H01H 71/02; H01H 71/1009; H02B 11/133
(Continued)

(56) References Cited

U.S. PATENT DOCUMENTS

2003/0112574 A1\* 6/2003 Inami ..................... H01H 33/52
361/115

FOREIGN PATENT DOCUMENTS

| CN | 102484002 A | 5/2012 |
| CN | 203218164 U | 9/2013 |

(Continued)

OTHER PUBLICATIONS

Extended European Search Report, issued by the European Patent Office, regarding correspoinding patent application Serial No. EP 21155766.5; dated Aug. 25, 2021; 5 pages.

*Primary Examiner* — Edwin A. Leon
*Assistant Examiner* — Iman Malakooti
(74) *Attorney, Agent, or Firm* — Greenberg Traurig, LLP

(57) ABSTRACT

Embodiments of the present disclosure relate to a switch device, comprising: a first three-position switch; a second three-position switch disposed below the first three-position switch; a circuit breaker disposed between the first three-position switch and the second three-position switch. A first interlock unit is disposed above the circuit breaker and connected to the circuit breaker and the first three-position switch, and configured to block a manual operation of the first three-position switch in a closed state of the circuit breaker, and configured to block a manual closing operation of the circuit breaker while the first three-position switch is manually operated in an open state of the circuit breaker. A second interlock unit is disposed below the circuit breaker and connected to the circuit breaker and the second three-position switch, and is configured to block a manual operation of the second three-position switch in the closed state of the circuit breaker, and configured to block a manual closing operation of the circuit breaker while the second three-position switch is manually operated in the open state of the circuit breaker.

19 Claims, 13 Drawing Sheets

(51) Int. Cl.
*H01H 71/10* (2006.01)
*H02B 11/133* (2006.01)
*H02H 7/22* (2006.01)

(58) Field of Classification Search
USPC ..................................................... 200/50.32
See application file for complete search history.

(56) References Cited

FOREIGN PATENT DOCUMENTS

| | | | |
|---|---|---|---|
| CN | 103794390 A | 5/2014 | |
| CN | 206506160 U | 9/2017 | |
| CN | 208208638 U | 12/2018 | |
| EP | 2172956 * | 4/2010 | ............... H01H 3/30 |
| EP | 2172956 A2 | 4/2010 | |
| EP | 3389066 A1 | 10/2018 | |
| WO | 2013076048 A1 | 5/2013 | |

* cited by examiner

SWITCH DEVICE

FIELD

The present disclosure generally relate to a switch device, and more specifically to a switch device for a high voltage switch cabinet.

BACKGROUND

As is well known, only one three-position switch and one circuit breaker are usually mounted in the same switch cabinet. For example, a bus coupler includes one three-position switch and a circuit breaker, and a bus riser includes one three-position switch and one circuit breaker. The mechanical interlock between the circuit breaker and a corresponding disconnection switch is easily implemented with the above arrangement. However, in a conventional design, the bus coupler and the bus riser are usually two separate cabinets, and two cabinets are usually needed when the bus coupling function and bus rising function need to be achieved. Therefore, the overall size of the cabinets is made larger and the cost is made higher.

SUMMARY

In order to solve the above problems and at least some of other problems, the present disclosure provides a switch device which integrates two different functions such as a bus coupling function and a bus rising function in one cabinet. The switch device has a smaller size, fewer parts and lower mounting and manufacturing cost.

According to an aspect of the present disclosure, there is provided a switch device, comprising: a first three-position switch; a second three-position switch disposed below the first three-position switch; a circuit breaker disposed between and coupled to the first three-position switch and the second three-position switch; and a first interlock unit and a second interlock unit. The first interlock unit is disposed above the circuit breaker and coupled to the circuit breaker and the first three-position switch, and configured to block a manual operation of the first three-position switch in a closed state of the circuit breaker, and configured to block a manual closing operation of the circuit breaker while the first three-position switch is manually operated in an open state of the circuit breaker. The second interlock unit is disposed below the circuit breaker and coupled to the circuit breaker and the second three-position switch, and is configured to block a manual operation of the second three-position switch in the closed state of the circuit breaker, and configured to block a manual closing operation of the circuit breaker while the second three-position switch is manually operated in the open state of the circuit breaker.

In the switch device according to the present disclosure, the first three-position switch and the second three-position switch are disposed in the same cabinet, for example, one three-position switch is disposed above the other three-position switch in the same cabinet. The switch device can achieve different functions, and exhibit a smaller size, fewer parts, lower cost and easy mounting and manufacturing. In addition, the first interlock unit and the second interlock unit are also provided in the switch device. The first interlock unit and the second interlock unit are respectively disposed above and below the circuit breaker to achieve the interlock between the corresponding three-position switches and the circuit breaker. Therefore, in the switch device, the arrangement of the first and second interlock units can avoid maloperation of the circuit breaker (e.g., a vacuum circuit breaker) and two three-position switches to avoid accidents and meet the interlocking requirement of the switch device.

In an embodiment according to the present disclosure, the first three-position switch may be configured to implement bus coupling, and the second three-position switch may be configured to implement bus rising. However, those skilled in the art should appreciate that the positions of the first three-position switch for bus coupling and the second three-position switch for bus rising may be exchanged. In other embodiments, the first and second three-position switches may also perform other functions according to actual needs.

In an embodiment according to the present disclosure, the first interlock unit and the second interlock unit may be respectively configured to switch between a locked position and a released position, wherein at the locked position, the manual operation of the first three-position switch and the second three-position switch is not allowed. At the released position, the manual operation of the first three-position switch and the second three-position switch is allowed. The circuit breaker may include a rotatable main shaft, and the first interlock unit and the second interlock unit are each selectively engaged with the rotatable main shaft, and are respectively configured to: when the circuit breaker is closed, the first interlock unit and the second interlock unit are locked by the rotatable main shaft to be at the locked position to block the manual operation of the first three-position switch and the second three-position switch, and when the circuit breaker is opened, the first interlock unit and the second interlock unit are released by the rotatable main shaft to be at the released position to allow the manual operation of the first three-position switch and the second three-position switch.

Since the rotatable main shaft of the circuit breaker is associated with the closing and opening states of the circuit breaker, the interlock units can be locked or released by engaging each of the interlock units selectively with the rotatable main shaft of the circuit breaker. In addition, when the interlock units are at the locked position, the manual operation of the three-position switches is not allowed, and when the interlock units are at the released position, the manual operation of the three-position switches is allowed. Therefore, in the present embodiment, simply making the main shaft of the circuit breaker interact with the two interlock units, the manual operation of the three-position switches can be blocked when the circuit breaker is closed, and the manual operation of the three-position switches is allowed when the circuit breaker is opened.

In an embodiment according to the present disclosure, each of the first three-position switch and the second three-position switch may include: a first operation opening configured to permit manual implementation of a disconnection operation; a second operation opening configured to permit manual implementation of an earthing operation; and an access cover configured to be actuated to switch between a first position and a second position, where at the first position, the access cover covers both the first operation opening and the second operation opening, and at the second position, the access cover opens one of the first operation opening and the second operation opening.

By simply setting the access cover to cover and open the first and second operation openings, the manual operation of the disconnecting function and the earthing function of the three-position switches can be achieved through a simple mechanical structure.

In an embodiment according to the present disclosure, the first interlock unit may comprise a first transmission mechanism, the second interlock unit may comprise a second transmission mechanism, and the first transmission mechanism and the second transmission mechanism are connected to the corresponding access cover and capable of moving synchronously with the corresponding access cover, and the first transmission mechanism and the second transmission mechanism are respectively configured to be locked when the circuit breaker is closed, so that the access cover cannot be switched to the second position; and be released when the circuit breaker is opened, and actuated when the access cover is switched to the second position, so that the circuit breaker cannot be closed.

In this embodiment, both the first and second interlock units include a transmission mechanism that can be at the locked position and the released position due to the action of the main shaft of the circuit breaker. Specifically, the transmission mechanism is at the locked position when the circuit breaker is closed, and the transmission mechanism is at the released position when the circuit breaker is opened. Furthermore, with the transmission mechanism being engaged with the access cover and synchronously moving with the access cover, the access cover can also be at a locked position or first position not permitting the manual operation of the three-position switches due to the action of the main shaft of the circuit breaker, and at the released position or second position permitting the manual operation of the three-position switches. Hence, the interlock of the two three-position switches and the circuit breaker can be implemented through the interaction among the transmission mechanisms, the access cover and the main shaft of the circuit breaker.

In an embodiment according to the present disclosure, the first three-position switch may further comprise a first access cover rotating shaft, the access cover of the first three-position switch is fixedly mounted on the first access cover rotating shaft, and the first access cover rotating shaft is configured to be capable of being rotated so that the access cover of the first three-position switch is switched between the first position and the second position. The first transmission mechanism of the first interlock unit may comprise: a first link mechanism coupled to the first access cover rotating shaft and including a vertical extension, and configured to move synchronously with the first access cover rotating shaft; and a pivotable link configured to be capable of pivoting about an axis under actuation of the first link mechanism.

With the access cover being mounted on the rotating shaft, the switching of the positions of the access cover can be achieved simply through the knob on the rotating shaft. The first transmission mechanism comprises the first link mechanism and the pivotal link which interact with each other. The first interlock unit can synchronously move with the access cover through the first link mechanism included in the first transmission mechanism and connected to the first access cover rotating shaft. By including the pivotable link that can be actuated by the first link mechanism, the first interlock unit can actuate the linkage mechanism of a closing operation of the circuit breaker through the pivotable link.

In an embodiment according to the present disclosure, a first bi-link may be fixedly provided on the rotatable main shaft. The first bi-link may include two links spaced apart from each other by a certain space. The first bi-link may be configured to limit the vertical extension between the two links when the circuit breaker is closed, so that the first link mechanism cannot move, and thus the access cover of the first three-position switch cannot be switched to the second position, and configured to release the vertical extension when the circuit breaker is opened, so that the access cover of the first three-position switch can be moved to the second position and the first link mechanism can move to actuate the pivotable link to pivot about the axis.

It is possible to, by arranging the first bi-link on the main shaft and by locking and releasing the vertical extension of the link mechanism through the first bi-link, implement the locking and releasing operation of the first interlock unit and the locking and releasing operation of the access cover of the first three-position switch through simple engagement of the bi-link and the vertical extension.

In an embodiment according to the present disclosure, the circuit breaker may include a closing button, and the first interlock unit further includes a first linkage mechanism linked with the closing button, and the first linkage mechanism is configured to be capable of being engaged with the pivotable link when the circuit breaker is opened so that the closing button cannot be pressed. It is possible to avoid pressing the closing button due to maloperation, through the engagement between the first linkage mechanism and the pivotable link, when the circuit breaker is opened.

In an embodiment according to the present disclosure, the first link mechanism may include: a lever having a first end fixedly connected to the access cover rotating shaft to swing under the rotation actuation of the access cover rotating shaft; a first fixed pin fixedly disposed in the switch device; and a first slider supported by the first fixed pin and including the vertical extension, the first slider accommodating a second end of the lever and configured to slide horizontally along the first fixed pin as the lever swings.

Since the first link mechanism includes the lever and the first fixed pin, the rotary motion of the rotation axis of the access cover can be converted into horizontal sliding of the first slider, and the horizontal sliding of the first slider can then actuate the pivotable link to pivot about the axis, thereby engaging the first linkage mechanism.

In an embodiment according to the present disclosure, the first slider includes an elongated slot and a V-shaped slot, the first fixed pin is located in the elongated slot, and a first end of the pivotable link is engaged with the V-shaped slot. When the access cover of the first three-position switch is at the first position, the first fixed pin is located in the middle portion of the elongated slot, and the first end of the pivotable link is located in the middle portion of the V-shaped slot, and a second end of the pivotable link is not engaged with the first linkage mechanism. When the access cover of the first three-position switch is at the second position, the first fixed pin is located at an end of the elongated slot, and the first end of the pivotable link is located at an end of the V-shaped slot and is actuated by the end of the V-shaped slot to pivot the second end of the pivotable link into engagement with the first linkage mechanism.

The sliding of the first slider along the fixed pin can be simply realized by providing the elongated slot on the first slider. It is possible to, by providing the V-shaped slot on the first slider, actuate the pivotable link to engage the first linkage mechanism through the engagement of the V-shaped slot and the pivotable link, during the sliding process of the slider, thereby avoiding pressing the closing button due to maloperation when the circuit breaker is opened.

In an embodiment of the present disclosure, the second three-position switch may further comprise a second access cover rotating shaft, the access cover of the second three-position switch is fixedly mounted on the second access cover rotating shaft, and the second access cover rotating shaft is configured to be capable of being rotated so that the access cover of the second three-position switch is switchable between a first position and a second position. The second transmission mechanism of the second interlock unit may comprise: a pull wire connected to the second access cover rotating shaft and configured to be pulled down under the rotation actuation of the second access cover rotating shaft, and a second link mechanism is connected to the pull wire and configured to be movable in the vertical direction.

With the access cover being mounted on the rotating shaft, the switching of the positions of the access cover can be achieved simply through the knob on the rotating shaft. The second transmission mechanism comprises the pull wire and the second link mechanism which interact with each other. With the pull wire connected to the second access cover rotating shaft being included in the second transmission mechanism, movement conditions of the interlock unit can be associated with the access cover. Since the second link mechanism that can be actuated by the pull wire is also included, the interlock unit can engage the linkage mechanism of the closing switch of the circuit breaker by rotating the access cover, pulling the pull wire and thereby actuating the second link mechanism.

In an embodiment according to the present disclosure, a second bi-link may be fixedly provided on the rotatable main shaft. The second bi-link is spaced apart from the first bi-link and may be configured to: when the circuit breaker is closed, engage with and lock the second link mechanism so that it cannot move vertically, so that the pull wire cannot be pulled down and the access cover of the second three-position switch cannot be switched to the second position; and when the circuit breaker is opened, release the second link mechanism so that the access cover of the second three-position switch can move to the second position, and the second link mechanism can move.

It is possible to, by arranging the second bi-link on the main shaft and by locking and releasing the second link mechanism through the second bi-link, implement the locking and releasing operation of the second interlock unit and the locking and releasing operation of the access cover of the second three-position switch, through simple engagement of the bi-link and the second link mechanism.

In an embodiment according to the present disclosure, the circuit breaker may include a closing button, and the second interlock unit further includes a second linkage mechanism linked with the closing button, and the second linkage mechanism is configured to be engaged with the second link mechanism when the circuit breaker is opened so that the closing button cannot be pressed. It is possible to avoid pressing the closing button due to maloperation, through the engagement between the second linkage mechanism and the second link mechanism, when the circuit breaker is opened.

In an embodiment of the present disclosure, the second link mechanism includes a first portion, a second portion and a third portion, and the first portion and the third portion are respectively connected to both ends of the second portion. The second portion may be configured to pivot around a second fixed pin at the middle thereof, so that the first portion and the third portion are simultaneously locked, or so that when one of the first portion and the third portion moves upward, the other one moves downward. The third portion may be configured to: be locked when the circuit breaker is closed so that the first portion is also locked, and released when the circuit breaker is opened, so that the first portion can move in a direction opposite to the third portion.

Since the second link mechanism incudes the above first, second and third portions, the first portion and third portion can be locked simultaneously or move in opposite directions. When the first portion and the third portion are locked at the same time, the pull wire can be prevented from being pulled down, that is, the position of the access cover of the second three-position switch is prevented from being switched. When the first part and the third part move in opposite directions, the second linkage mechanism of the closing button can be actuated by the movement of the third portion or the first portion.

In an embodiment according to the present disclosure, the third portion may include a slot, and the slot accommodates a third fixed pin so that the third portion can slide up and down along the third fixed pin. When the circuit breaker is closed to cause the second bi-link to move upward, the second bi-link is engaged with an upper end of the third portion, and an upper end of the slot is engaged with the third fixed pin to limit movement of the third portion in the vertical direction. When the circuit breaker is opened to cause the second bi-link to move upwards, the second bi-link releases the upper end of the third portion so that the first portion can move downward under the pull of the pull wire, and meanwhile the third portion can move upward.

The third portion can be locked through the interaction of the second bi-link and the third fixed pin. When the third portion is released, due to the mutual engagement of the slot and the third fixed pin, a movement range of the third portion is also limited by the length of the slot, so that the third portion will not move upward without restriction.

In an embodiment according to the present disclosure, the first portion may include: a vertical plate having a lower end connected to an end of the second portion opposite to the third portion and connected to the pull wire, and a second slider connected to an upper end of the vertical plate and having an upper end provided with a groove; at an end of a downward movement stroke of the first portion, the first portion is engaged with the second linkage mechanism through an upper end of the groove. With the second slider being provided with the groove, the second linkage mechanism can be engaged in a simple way when the first portion moves downward.

In an embodiment according to the present disclosure, each of the first three-position switch and the second three-position switch may include: a first auxiliary switch for implementing a disconnection function; a second auxiliary switch for implementing an earthing function; wherein when one of the first auxiliary switch and the second auxiliary switch is in an open state, the other one of the first auxiliary switch and the second auxiliary switch is in a closed state.

The auxiliary switches are important parts of the three-position switches. The disconnection function and the earthing function can be performed by allowing each three-position switch to include two auxiliary switches. In addition, only one of the two auxiliary switches can be in the closed state at the same time, so that the earthing function of the three-position switch is allowed only when the disconnection function is blocked, and the disconnection function of the three-position switch can be allowed only when the earthing function is blocked.

In an embodiment according to the present disclosure, the first auxiliary switch may include: a first main shaft, and a first indicator disposed on the first main shaft and being movable together with the first main shaft to indicate a state of the disconnection function of each of the first three-position switch and the second three-position switch; the second auxiliary switch includes: a second main shaft, and a second indicator disposed on the second main shaft and being movable move together with the second main shaft to indicate a state of the earthing function of each of the first three-position switch and the second three-position switch. Since the indicators move synchronously with the main shafts, the earthing state and disconnection state of the three-position switch can be accurately indicated by the indicators.

In an embodiment according to the present disclosure, the three-position switch further includes: a first drive mechanism including a first cam groove and configured to drive the first main shaft to rotate; a second drive mechanism including a second cam groove and configured to drive the second main shaft to rotate. The second cam groove and the first cam groove are configured to move synchronously, and are oriented in such a way that at the same time, a position of the first cam groove relative to the first main shaft is different from a position of the second cam groove relative to the second main shaft.

The drive mechanism includes cam grooves moving simultaneously and oriented differently, the position of the first cam groove relative to the first main shaft is different from the position of the second cam groove relative to the second main shaft at the same time, which causes the actuation states of the first auxiliary switch and second auxiliary switch to be different at the same time, i.e., only one of the two auxiliary switches can be in the closed state at the same time.

In an embodiment according to the present disclosure, the first drive mechanism further includes: a first auxiliary switch drive shaft configured to actuate the first auxiliary switch; a first gear which is mounted on the first auxiliary switch drive shaft and on which the first cam groove is provided; and a first drive link connected between the first cam groove and the first main shaft and configured to drive the first main shaft while moving along the first cam groove; and the second drive mechanism further comprises: a second auxiliary switch drive shaft configured to actuate the second auxiliary switch; a second gear which is mounted on the second auxiliary switch drive shaft and meshes with the first gear and on which the second cam groove is disposed; and a second drive link connected between the second cam groove and the second main shaft and configured to drive the second main shaft while moving along the second cam groove.

The rotary motion of the drive shaft can be converted into a motion of the drive link along the cam groove by allowing the first drive mechanism to include the drive shaft, the gear with the cam groove and the drive link. Since the first cam groove and second cam groove are oriented differently, the first and second drive links have different movement trajectories, thereby causing different actuation results of the first main shaft and second main shaft.

In an embodiment according to the present disclosure, each of the first three-position switch and the second three-position switch may further include: a central pivot pin disposed between the first auxiliary switch drive shaft and the second auxiliary switch drive shaft. Each of the first drive link and the second drive link includes: a first link portion having an end pivoting around the central pivot pin, and a second link portion connected between the other end of the first link portion and the main shaft of the corresponding auxiliary switch, wherein a pin body is disposed in the middle portion of the first link portion, and moves along the corresponding cam groove, so that at the same time, a position of the first drive link relative to the first cam groove is different from a position of the second drive link relative to the second cam groove.

With the pin body being disposed on the drive link, the drive link can better move following the shape of the cam groove, thereby better achieving different movement trajectories of the drive link during the movement, and thereby causing different actuation results of the first main shaft and the second main shaft.

DETAILED DESCRIPTION OF EMBODIMENTS

Figure 1:
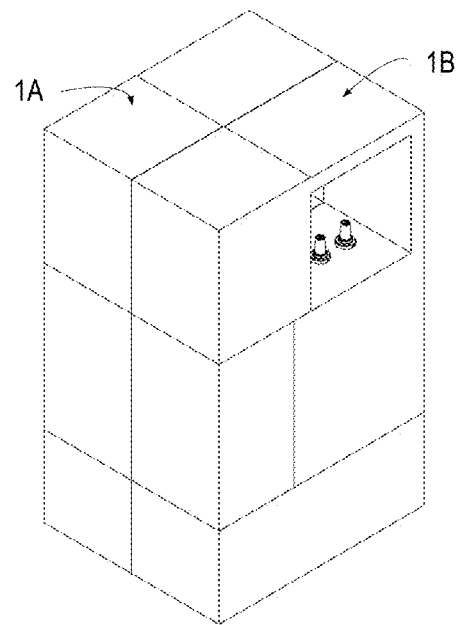
FIG. 1 is a perspective view illustrating a switch device integrating two functions according to a conventional design.

Various embodiments are now described with reference to the figures, where like reference numerals are used to designate similar elements throughout the text. In the following description, for the purpose of illustration, many specific details are set forth to promote thorough understanding of one or more embodiments. However, it might be very apparent in some or all cases that any embodiment described below can be practiced without using specific design details described hereunder. In other instances, well-known structures and devices are shown in block diagram form to facilitate describing one or more embodiments. A simplified summary of one or more embodiments is presented below to provide basic understanding of the embodiments. This summary is not an exhaustive overview of all anticipated embodiments, is not intended to identify key or important elements of all embodiments, nor is it intended to define the scope of any or all embodiments.

References to "an embodiment" or "one embodiment" in the framework of the description are intended to indicate that particular configurations, structures or characteristics described with respect to the embodiment are included in at least one embodiment. Therefore, phrases such as "in an embodiment" or "in one embodiment" that may be present at one or more points in the description do not necessarily refer to the same embodiment. In addition, in one or more embodiments, specific configurations, structures or characteristics may be combined in any suitable manner.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures. Unless specified otherwise, the expressions "around", "approximately", "substantially" and "about" signify within 10%, and preferably within 5%.

FIG. 1 is a perspective view illustrating a switch device (e.g., a high voltage switch cabinet) integrating two functions according to a conventional design. In the conventional design, a bus coupler 1A and a bus riser 1B are usually connected together in parallel to simultaneously provide two functions, e.g., a bus coupling function and a bus rising function. A three-position switch and a circuit breaker are disposed in the bus coupler 1A and the bus riser 1B, respectively, and the interlock between the three-position switch and the circuit breaker is achieved in each cabinet. It can be seen from FIG. 1 that the cabinet according to the conventional design has a large volume, needs many parts, and exhibits a higher cost and troublesome installation. In one conventional design, the cabinet having the bus coupler 1A and bus riser 1B disposed in parallel has a width of about 1200 mm and a height of about 1300 mm.

Figure 2:
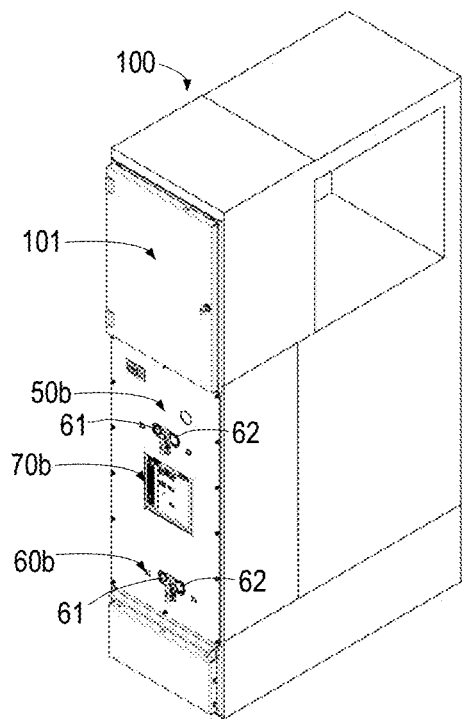
FIG. 2 is a perspective view illustrating a switch device integrating two functions according to an embodiment of the present disclosure.

FIG. 2 is a perspective view illustrating a switch device integrating two functions according to an embodiment of the present disclosure. Two different functions, e.g., a bus coupling function and a bus rising function, are integrated in the switch device according to the present disclosure. As shown in FIG. 2, the switch device 100 includes: a three-position switch 50 for implementing the bus coupling function; another three-position switch 60 for implementing the bus rising function; and one circuit breaker 70. In an embodiment, the switch device according to the present disclosure has a width, which is half (namely, about 600 mm) of the cabinet in the conventional design and a height of about 1315 mm. The switch device according to the present disclosure exhibits a smaller volume, a simpler and easier installation process, a higher reliability and a lower manufacturing and assembling cost.

Although it is shown in the figure that the three-position switch for implementing the bus coupling function is located above the three-position switch for implementing the bus rising function, the positions of the two three-position switches in the present disclosure are not limited thereto. The positions of the two three-position switches may also be inverted. In other embodiments, the first three-position switch 50 and the second three-position switch 60 may also achieve other functions as required.

In the present disclosure, the interlock of the three-position switch and the circuit breaker means: in a closed state of the circuit breaker 70, a manual operation of the first three-position switch 50 is blocked, and in an open state of the circuit breaker 70, a manual closing operation of the circuit breaker 70 is blocked while the first three-position switch 50 is manually operated; and in the closed state of the circuit breaker 70, a manual operation of the second three-position switch 60 is blocked, and in the open state of the circuit breaker 70, the manual closing operation of the circuit breaker 70 is blocked while the second three-position switch 60 is manually operated.

As shown in FIG. 2, the switch device 100 includes a surface 101 on or near which are provided openings for manual operation of the first three-position switch 50 and the second three-position switch 60, for example, a first operation opening 61 for performing a disconnection operation of the three-position switches, and a second operation opening 62 for performing an earthing operation of the three-position switches. The user may observe these operation openings from the outside of the switch device 100, and may insert an operating tool into these operation openings. In the case where the opening 61 or 62 is opened, the user may insert the operating tool through the opening 61 or 62 to perform the disconnection operation or earthing operation.

Figure 3:
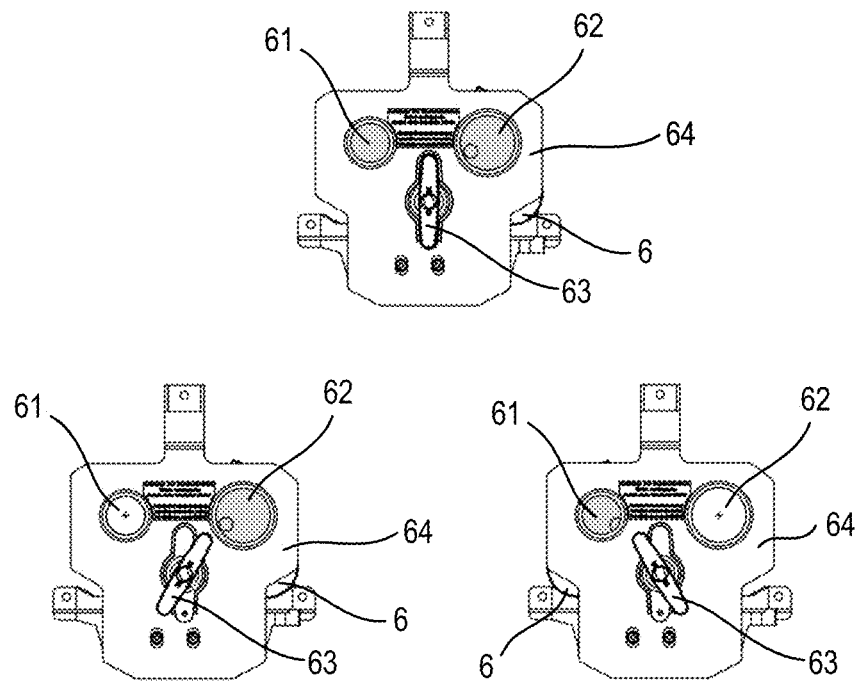
FIG. 3 is a front view showing the positional relationship between an access cover of each three-position switch operation mechanism and first and second operation openings.

FIG. 3 illustrates the positional relationship between an access cover of each three-position switch and the first and second operation openings 61 and 62. The access cover 6 is a part of first and second three-position switch operation mechanisms (which will be illustrated below with reference to FIG. 4). The first and second operation openings 61 and 62 are provided on a front cover plate 64 through which a knob 63 extends. The access cover 6 of each three-position switch is disposed behind the front cover plate 64 and is connected to the knob 63. By rotating the knob 63, the access cover 6 may be rotated so that the access cover 6 can be located at a first position or a second position. In the first position, the access cover 6 covers both the first and second operation openings 61 and 62, as shown in the upper view of FIG. 3, and in the second position, the access cover 6 covers one of the first and second operation openings 61 and 62 and opens the other of the first and second operation openings 61 and 62, as shown in the left lower view and right lower view of FIG. 3. As shown in FIG. 3, at the same time, both the first operation opening 61 and the second operation opening 62 are closed, or one of them is opened, so that at one time, the manual operation of the three-position switches is not permitted, or only one of the disconnection function and earthing function of the three-position switches can be implemented.

Figure 4:
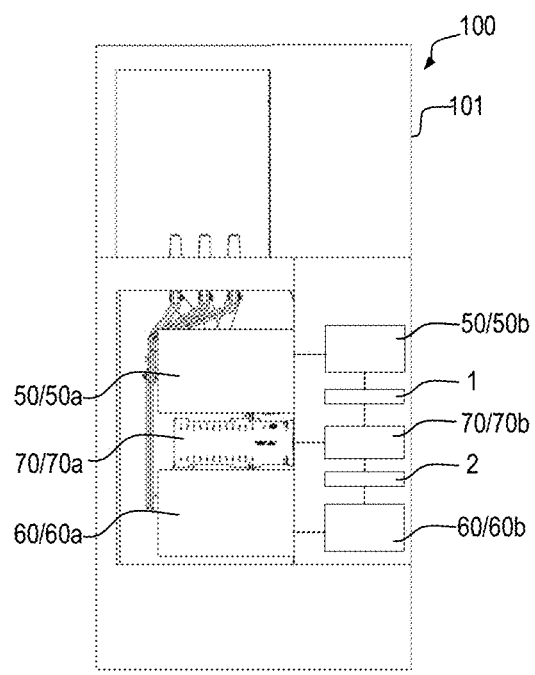
FIG. 4 is a side view illustrating a switch device in a high-voltage switch cabinet according to an embodiment of the present disclosure.
Figure 5:
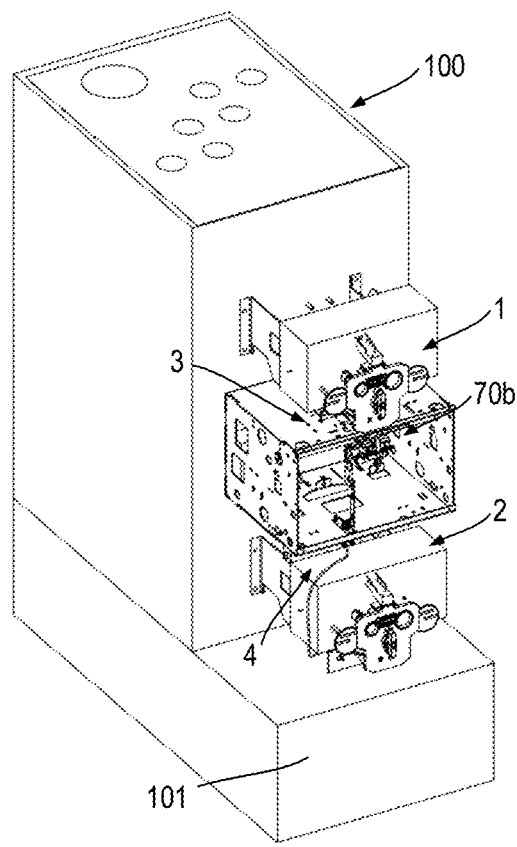
FIG. 5 is a partial perspective view illustrating the switch device according to the embodiment of the present disclosure, which shows the positional relationship between a first interlock unit, a second interlock unit and a circuit breaker.
Figure 6:
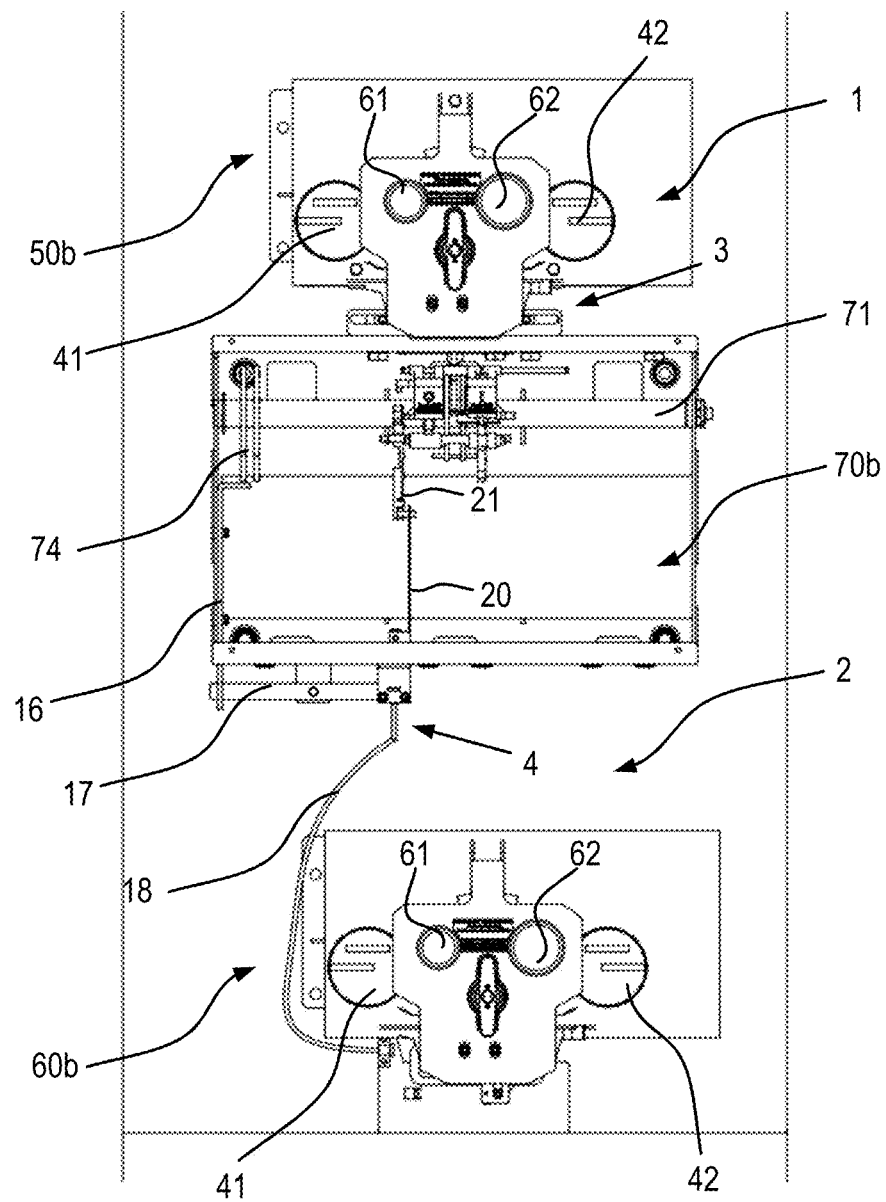
FIG. 6 is a front view illustrating a part of the switch device including the first interlock unit, the second interlock unit and the circuit breaker according to the embodiment of the present disclosure.

FIG. 4 is a side view illustrating the switch device 100 in a high-voltage switch cabinet according to the embodiment of the present disclosure. FIG. 5 is a partial perspective view illustrating the switch device 100 according to the embodiment of the present disclosure, which shows the positional relationship between a first interlock unit 1, a second interlock unit 2 and a circuit breaker 70. FIG. 6 is a front view illustrating a part of the switch device 100 including the first interlock unit 1, the second interlock unit 2 and the circuit breaker 700 according to the embodiment of the present disclosure.

As shown in FIG. 4, the first three-position switch 50 includes a first three-position switch body portion 50a and a first three-position switch operation mechanism 50b which is configured to manually operate the first three-position switch body portion 50a and disposed adjacent to the surface 101. The second three-position switch 60 includes a second three-position switch body portion 60a and a second three-position switch operation mechanism 60b which is configured to manually operate the second three-position switch body portion 60a and disposed adjacent to the surface 101. The circuit breaker 70 includes a circuit breaker body portion 70a and a circuit breaker operation mechanism 70b which is disposed close to the surface 101. As shown in FIGS. 4-6, the first interlock unit 1 is located above the circuit breaker 70 and connected to both the circuit breaker 70 and the first three-position switch 50, and specifically located above the circuit breaker operation mechanism 70b, and connected to both the circuit breaker operation mechanism 70b and the first three-position switch operation mechanism 50b, thereby achieving the interlock between the first three-position switch 50 and the circuit breaker 70. The second interlock unit 2 is located below the circuit breaker 70 and connected to both the circuit breaker 70 and the second three-position switch 60, and specifically located below the circuit breaker operation mechanism 70b and connected to both the circuit breaker operation mechanism 70b and the second three-position switch operation mechanisms 60b to achieve the interlock between the second three-position switch 60 and the circuit breaker 70.

Figure 7:
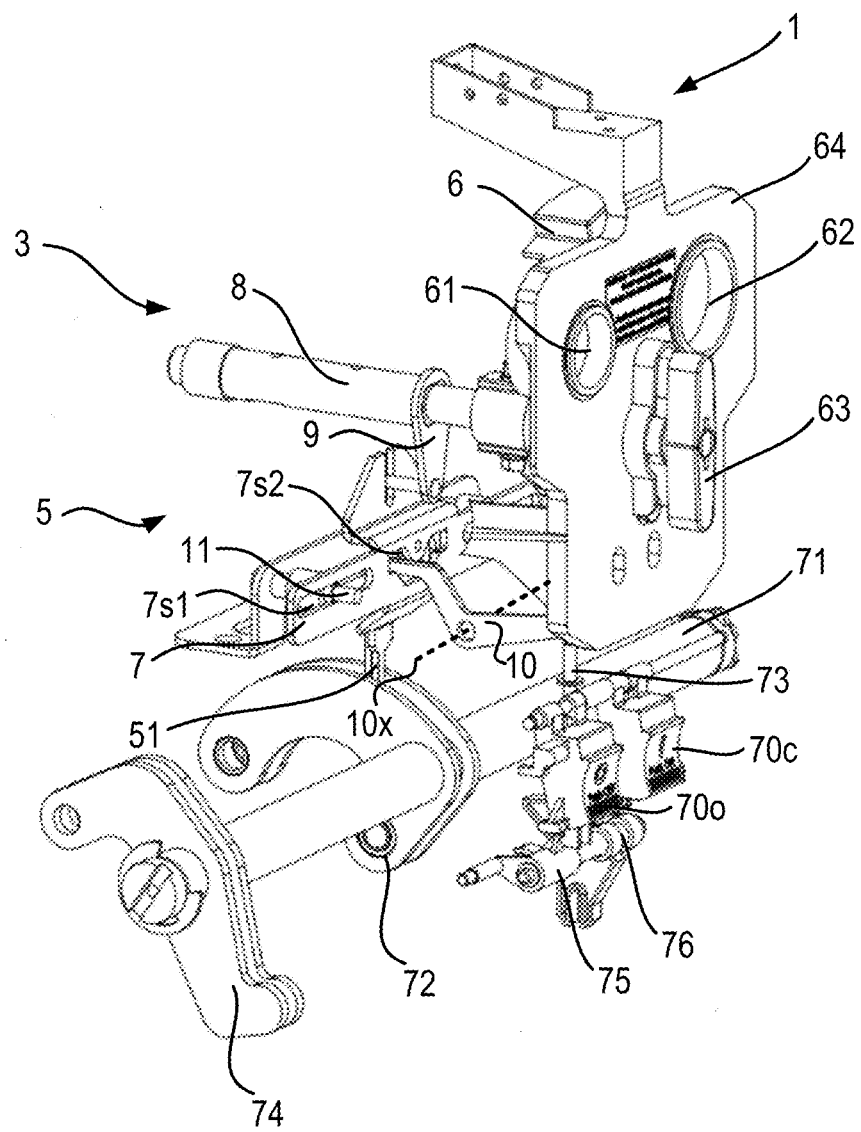
FIG. 7 is a perspective view illustrating a part of the switch device including the first interlock unit according to the embodiment of the present disclosure, where the circuit breaker is in a closed state, the access cover is at a first position and the first interlock unit is in a locked state.
Figure 8:
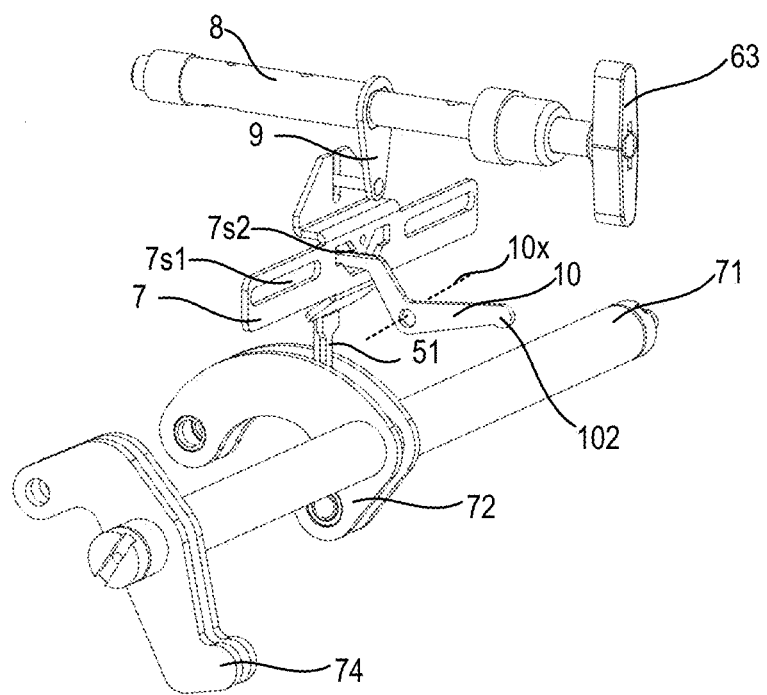
FIG. 8 is a perspective view illustrating a part of the structure shown in FIG. 7.
Figure 9:
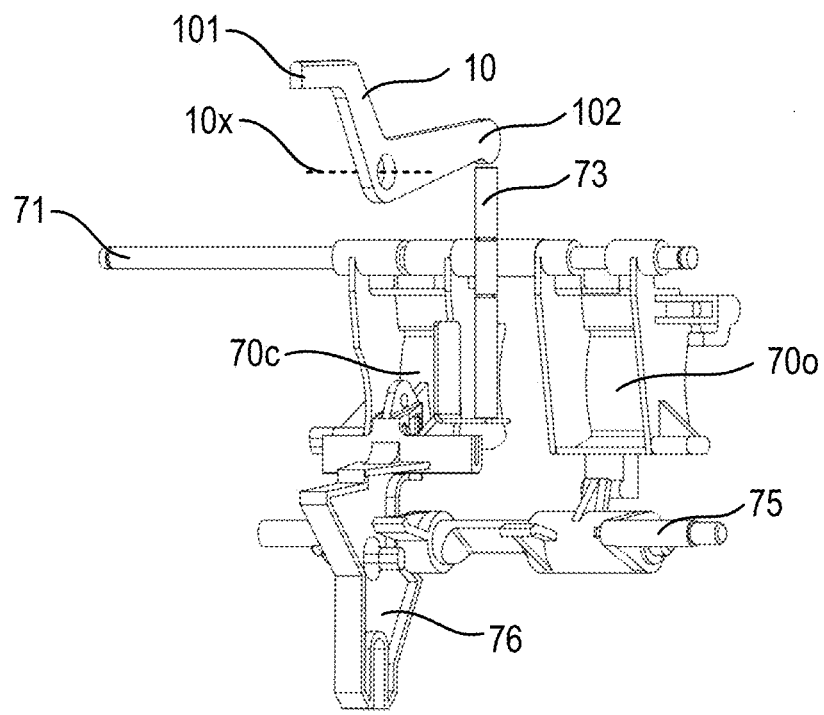
FIG. 9 is a rear perspective view illustrating a portion of the structure shown in FIG. 7.

FIG. 7 is a perspective view illustrating a part of the switch device 100 including adjacent to the first interlock unit 1 according to the embodiment of the present disclosure, where the circuit breaker 70 is in a closed state, the access cover 6 is at a first position and the first interlock unit 1 is in a locked state. FIG. 8 is a perspective view illustrating a part of the structure shown in FIG. 7. FIG. 9 is a rear perspective view illustrating a portion of the structure shown in FIG. 7.

As shown in FIGS. 7-9, the circuit breaker 70, specifically a circuit breaker operation mechanism 70b, includes a rotatable main shaft 71 which is rotatable in different directions when the circuit breaker 70 is closed and opened. As shown in FIGS. 7 and 9, the circuit breaker 70, specifically a circuit breaker operation mechanism 70b, further includes a closing button 70c and an opening button 70o.

As shown in FIG. 7, the first interlock unit 1 includes a first transmission mechanism 3, and a first linkage mechanism 73 linked with the closing button 70c, wherein when the first linkage mechanism 73 is engaged by the first transmission mechanism 3, the closing button 70c cannot be pressed. The first transmission mechanism 3 can be switched between a locked position and a released position. When the circuit breaker 70 is closed, the first transmission mechanism 3 is locked to be in the locked position, so that the access cover 6 cannot be switched to the second position. When the circuit breaker 70 is opened, the first transmission mechanism 3 is released to be in the released position. Specifically, the first transmission mechanism 3 is released by the rotatable main shaft 71 so that the access cover 6 may be switched to the second position. When the access cover 6 is switched to the second position, the first transmission mechanism 3 can be actuated to engage the first linkage mechanism 73, so that the circuit breaker 70 cannot be closed, that is, the closing button 70c cannot be pressed. As shown in FIG. 7, in one embodiment, to lock and release the first transmission mechanism 3, the rotatable main shaft 71 may be provided with a first bi-link 72 fixed thereon. When the circuit breaker 70 is closed, the first bi-link 72 swings upward. In the closed state as shown in FIG. 7, the first bi-link 72 is at an upper limit position.

As shown in FIG. 7, the knob 63 is connected to a first access cover rotating shaft 8. The access cover 6 is fixedly mounted on the first access cover rotating shaft 8, and the first access cover rotating shaft 8 is configured to rotate under the actuation of the knob 63, so that the access cover 6 can be switched between the first position and the second position. As shown in FIG. 7, the first transmission mechanism 3 includes a first link mechanism 5 and a pivotable link 10. The first link mechanism 5 is connected to the first access cover rotating shaft 8 and configured to move synchronously with the first access cover rotating shaft 8. The pivotable link 10 is configured to pivot about an axis 10x under the actuation of the first link mechanism 5 to engage with the first linkage mechanism 73, so that the circuit breaker 70 cannot be closed. In order to engage with the first bi-link 72, the first link mechanism 5 preferably includes a vertical extension 51. When the circuit breaker 70 is closed, the first bi-link 72 swings upward to house the vertical extension 51 between two links of the first bi-link 72, and when the circuit breaker 70 is opened, the first bi-link 72 swings downward to release the vertical extension 51 therefrom.

Hereinafter, the first link mechanism 5 according to the embodiment of the present disclosure will be described in detail with reference to the figures. As shown in FIGS. 7 and 8, the first link mechanism 5 includes a lever 9, a first fixed pin 11 fixedly disposed in the switch device 100, and a first slider 7. A first end of the lever 9 is fixedly connected to the access cover rotating shaft 8, and a second end of the lever 9 is received by the first slider 7. The vertical extension 51 is preferably provided on the first slider 7. As shown in FIGS. 7 and 8, the first slider 7 further includes an elongated slot 7s1 and a V-shaped slot 7s2. The first fixed pin 11 is located in the elongated slot 7s1, and the first end 101 of the pivotable link 10 engages with the V-shaped slot 7s2.

As shown in FIGS. 7 and 8, when the circuit breaker 70 is closed, the first bi-link 72 swings upward to house the vertical extension 51 between the two links of the first bi-link 72, so that at this time, the first slider 7 cannot slide along the first fixed pin 11 and at this time the first fixed pin 11 is substantively located in the middle of the elongated slot 7s1, and then the lever 9 cannot swing, so the access cover rotating shaft 8 cannot rotate, that is, the access cover 6 cannot be switched to the second position at this time. In addition, at this moment, the first end 101 of the pivotable link 10 is substantively located in the middle of the V-shaped slot 7s2, and a second end 102 of the pivotable link 10 is not engaged with the first linkage mechanism 73.

When the circuit breaker 70 is opened, the first bi-link 72 swings downward to release the vertical extension 51, thereby releasing the first slider 7, the lever 9 and the access cover rotating shaft 8. At this time, the user can rotate the access cover rotating shaft 8 by rotating the knob 63 to switch the access cover 6 to the second position, so that the lever 9 swings and in turn the first slider 7 slides along the first fixed pin 11 such that the end of the elongated slot 7s1 comes into contact with the first fixed pin 11, and the end of the V-shaped slot 7s2 comes into contact with the first end 101 of the pivotable link 10 and is actuated by the end of the V-shaped slot 7s2 so as to pivot the second end 102 of the pivotable link 10 to engage with the first linkage mechanism 73. At this time, since the first linkage mechanism 73 is engaged by the pivotable link 10, the closing button 70c cannot be pressed.

Figure 10:
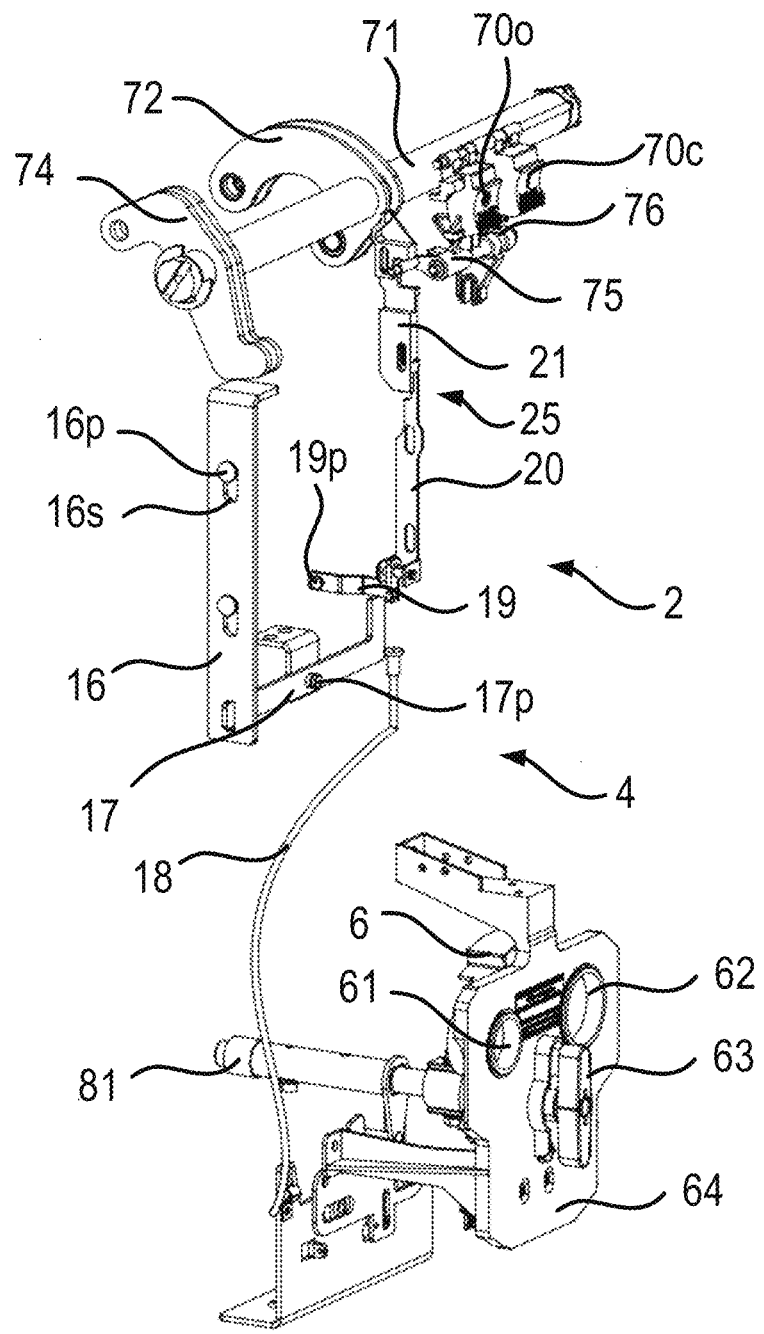
FIG. 10 is a perspective view illustrating a part of the switch device including the second interlock unit according to the embodiment of the present disclosure, wherein the circuit breaker is in a closed state, the access cover is at a first position, and the second interlock unit is in a locked state.
Figure 11:
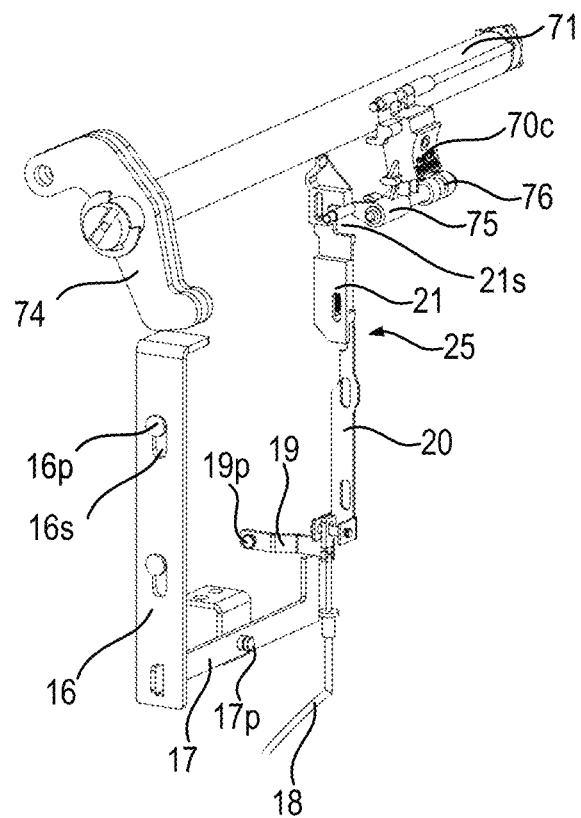
FIG. 11 is an enlarged perspective view illustrating a part of the structure shown in FIG. 10.
Figure 12:
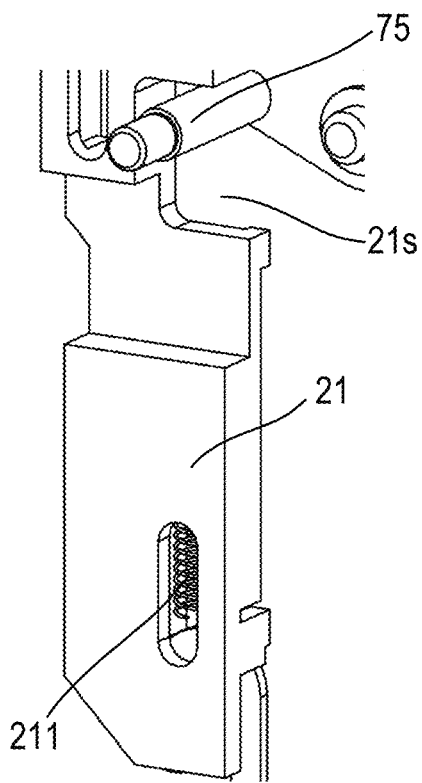
FIG. 12 is a perspective view illustrating a second slider according to an embodiment of the present disclosure.
Figure 13:
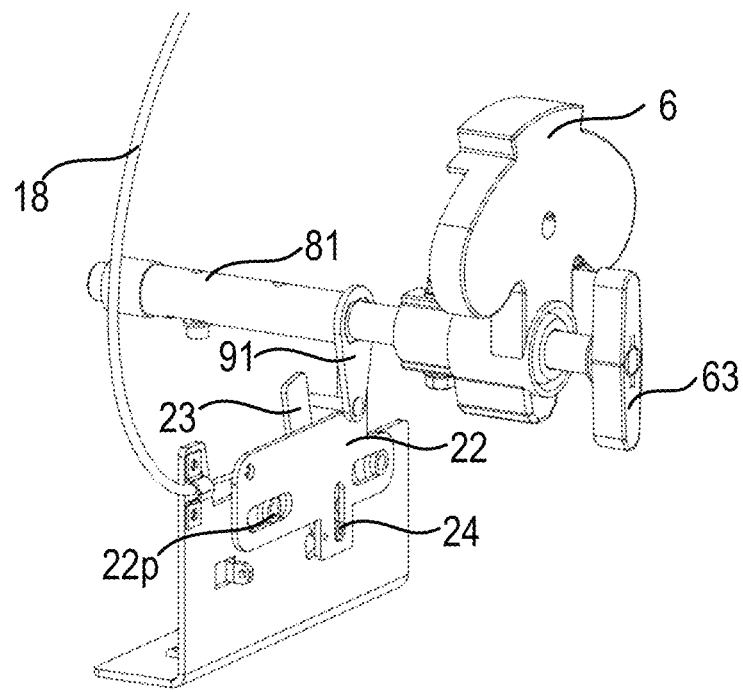
FIG. 13 is an enlarged perspective view illustrating another part of the structure shown in FIG. 10.
Figure 14:
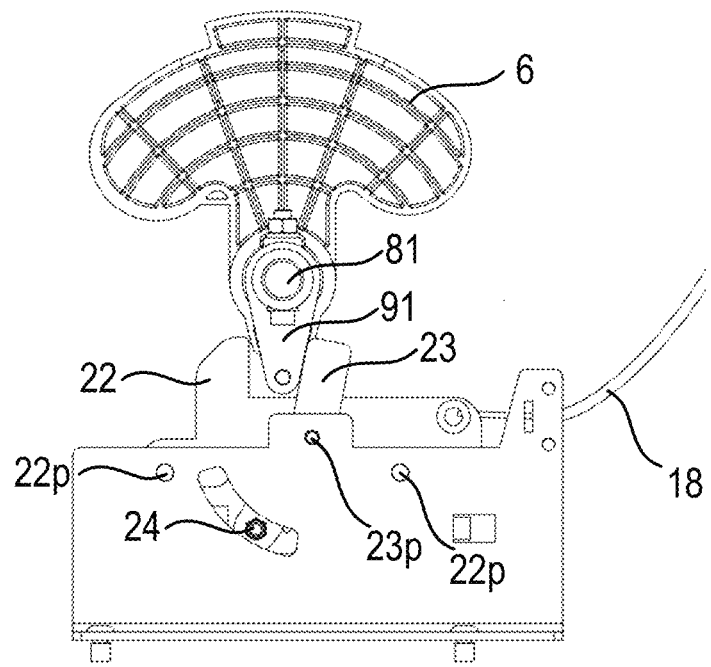
FIG. 14 is a rear view illustrating the structure shown in FIG. 13.

FIG. 10 is a perspective view illustrating a part of the switch device 100 including the second interlock unit 2 according to the embodiment of the present disclosure, wherein the circuit breaker 70 is in a closed state, the access cover 6 is at the first position, and the second interlock unit 2 is in a locked state. FIG. 11 is an enlarged perspective view illustrating a part of the structure shown in FIG. 10. FIG. 12 is a perspective view illustrating a second slider according to the embodiment of the present disclosure. FIG. 13 is an enlarged perspective view illustrating another part of the structure shown in FIG. 10. FIG. 14 is a rear view illustrating the structure shown in FIG. 13.

As shown in FIGS. 10 and 13, the knob 63 is connected to the second access cover rotating shaft 81. The access cover 6 of the second three-position switch 60 (specifically, the second three-position switch operation mechanism 60b) is fixedly mounted on the second access cover rotating shaft 81, and the second access cover rotating shaft 81 is configured to rotate under actuation of the knob 63, so that the access cover 6 can be switched between the first position and the second position. As shown in FIG. 10, the second interlock unit 2 includes a second transmission mechanism 4 and a second linkage mechanism 75 linked with the closing button 70c. When the second linkage mechanism 75 is actuated, it can be rotated to actuate a member 76 so that the closing button 70c cannot be pressed and the circuit breaker 70 cannot be closed. The second transmission mechanism 4 can be switched between the locked position and the released position. When the circuit breaker 70 is closed, the second transmission mechanism 4 is locked to be at the locked position, so that the access cover 6 cannot be switched to the second position. When the switch 70 is opened, the second transmission mechanism 4 is released to be at the released position. Specifically, the second transmission mechanism 4 is released by the rotatable main shaft 71 so that the access cover 6 can be switched to the second position. When the access cover 6 is switched to the second position, the second transmission mechanism 4 can be actuated to engage the second linkage mechanism 75 so that the circuit breaker 70 cannot be closed, that is, the closing button 70c cannot be pressed.

As shown in FIGS. 10 and 11, in one embodiment, in order to lock and release the second transmission mechanism 4, the rotatable main shaft 71 may be provided with a second bi-link 74 fixed thereon, which is spaced apart from the first bi-link 72. Although in the illustrated embodiment, the second bi-link 74 is closer to the end of the main shaft 71, the positions of the second by-link 74 and first bi-link 72 can vary with actual design needs. When the circuit breaker 70 is closed, the second bi-link 74 swings downward, whereas when the circuit breaker 70 is opened, the second bi-link 74 swings upward. In the closed state as shown in FIGS. 10 and 11, the second bi-link 74 is at the lower limit position.

As shown in FIG. 10, the second transmission mechanism 4 of the second interlock unit 2 includes a pull wire 18, which is connected to the second access cover rotating shaft 81 and configured to be pulled down under the rotation actuation of the second access cover rotating shaft 81. In the embodiment according to the present disclosure, when the second access cover rotating shaft 81 is rotated clockwise or counterclockwise, the pull wire 18 will be pulled down, which will be described in detail below. The second transmission mechanism 4 further includes a second link mechanism which is connected to the pull wire 18 and configured to move in the vertical direction. Specifically, when the pull wire 18 is pulled downward, the second link mechanism can move in the vertical direction.

Hereinafter, the connection manner of the pull wire 18 and other parts will be described in detail with reference to FIGS. 13 and 14. As shown in FIGS. 13 and 14, the pull wire 18 is fixed to a sliding plate 22 which can slide horizontally along the fixed pin 22p. The sliding plate 22 is provided with a slit to accommodate the pin 24. The pin 24 is located at one end of a toggle lever 23, the other end of the toggle lever 23 is engaged with the lever 91, and the toggle lever 23 can pivot around a pivot pin 23p. As shown in FIGS. 13 and 14, the lever 91 is fixedly engaged with the second access cover rotating shaft 81, so when the second access cover rotating shaft 81 rotates, the lever 91 is driven to swing. As shown in FIG. 14, when the lever 19 swings clockwise, it engages a protrusion of the sliding plate 22 to drive the sliding plate 22 to move to the left, thereby pulling the pull wire 18 downward. As shown in FIG. 14, when the lever 19 swings counterclockwise, it engages an upper end of the toggle lever 23, thereby driving the pin 24 to move to the left. Since the pin 24 is accommodated in the slit of the sliding plate 22, the pin 24 can drive the sliding plate 22 to move to the left, so that the pull wire 18 is also pulled down in this case.

The structure of the second link mechanism of the second transmission mechanism 4 will be described in detail below with reference to FIG. 10. As shown in FIG. 10, the second link mechanism includes a first portion 25, a second portion 17 and a third portion 16, and the first portion 25 and the third portion 16 are respectively connected to both ends of the second portion 17. The second portion 17 is configured to pivot around a second fixed pin 17p at the middle thereof, so that the first portion 25 and the third portion 16 are simultaneously locked, or such that when one of the first portion 25 and the third portion 16 moves upward, the other moves downward. The third portion 16 includes a slot 16s, and the slot 16s accommodates a third fixed pin 16p so that the third portion 16 can slide up and down along the third fixed pin 16p. The first portion 25 includes a vertical plate 20 and a second slider 21. A lower end of the vertical plate 20 is connected to an end of the second portion 17 opposite to the third portion 16 and is coupled to the pull wire 18. The second slider 21 is connected to an upper end of the vertical plate 20, and a groove 21s is provided at the upper end of the second slider 21. Preferably, the second part 23 further includes a pivot rod 19 which pivots around a fourth fixed pin 19p, so that when the second part 23 moves up and down, the pivot rod 19 pivots around the fourth fixed pin 19p.

As shown in FIG. 10, when the circuit breaker 70 is closed, the second bi-link 74 is moved to a lower limit position, thereby engaging the upper end of the third portion 16, and the upper end of the slot 16s engages with the third fixed pin 16p to restrict the movement of the third portion 16 in the vertical direction. At this time, the third portion 16 on the left side of the second portion 17 cannot move up and down, and the first portion 25 on the right side of the second portion 17 cannot move up and down either. In this case, the pull wire 18 cannot be pulled down. When the circuit breaker 70 is opened, the second bi-link 74 is moved to the upper limit position to release the upper end of the third portion 16 so that the third portion 16 may move up and down, whereupon the first portion 25 may also move up and down. At this time, the user may rotate the knob 63 to actuate the second access cover rotating shaft 81 to actuate the access cover 6 to the second position. At this time, whatever direction the lever 91 swings, it will cause the pull wire 18 to be pulled downwards, thereby driving the first portion 25 to be pulled downwards. At this time, the upper end of the groove 21s of the second slider 21 of the first portion 25 can engage the second linkage mechanism 75. In the case where the second linkage mechanism 75 is engaged, it actuates the member 76 so that the closing button 70c cannot be pressed and the circuit breaker 70 cannot be closed. Preferably, at an end of a downward movement stroke of the first portion 25, the first portion 25 engages the second linkage mechanism 75 through the upper end of the groove 21s.

As shown in FIG. 12, a return spring 211 is disposed on the second slider 21. In a state in which the pull wire 18 is not pulled, the return spring 211 in the second slider 21 returns the groove 21s to a state in which the groove 21s does not engage the second linkage mechanism 75, thereby releasing the second linkage mechanism 75.

The three-position switches 50 and 60 are usually provided with auxiliary switches, respectively, which are main components of the three-position switch operation mechanisms 50b and 60b to implement disconnection opening/closing function or earthing opening/closing function of the three-position switches. In the conventional design, a drive device for the auxiliary switch is usually complicated and it is difficult for the drive device to control the auxiliary switch precisely and reliably. There are usually many components in the mechanical transmission system of the drive device. This increases the cost and difficulty in mounting. Due to the poor synchronization effect between the auxiliary switch and the drive device, the auxiliary switch usually cannot reach a precise position.

Figure 15:
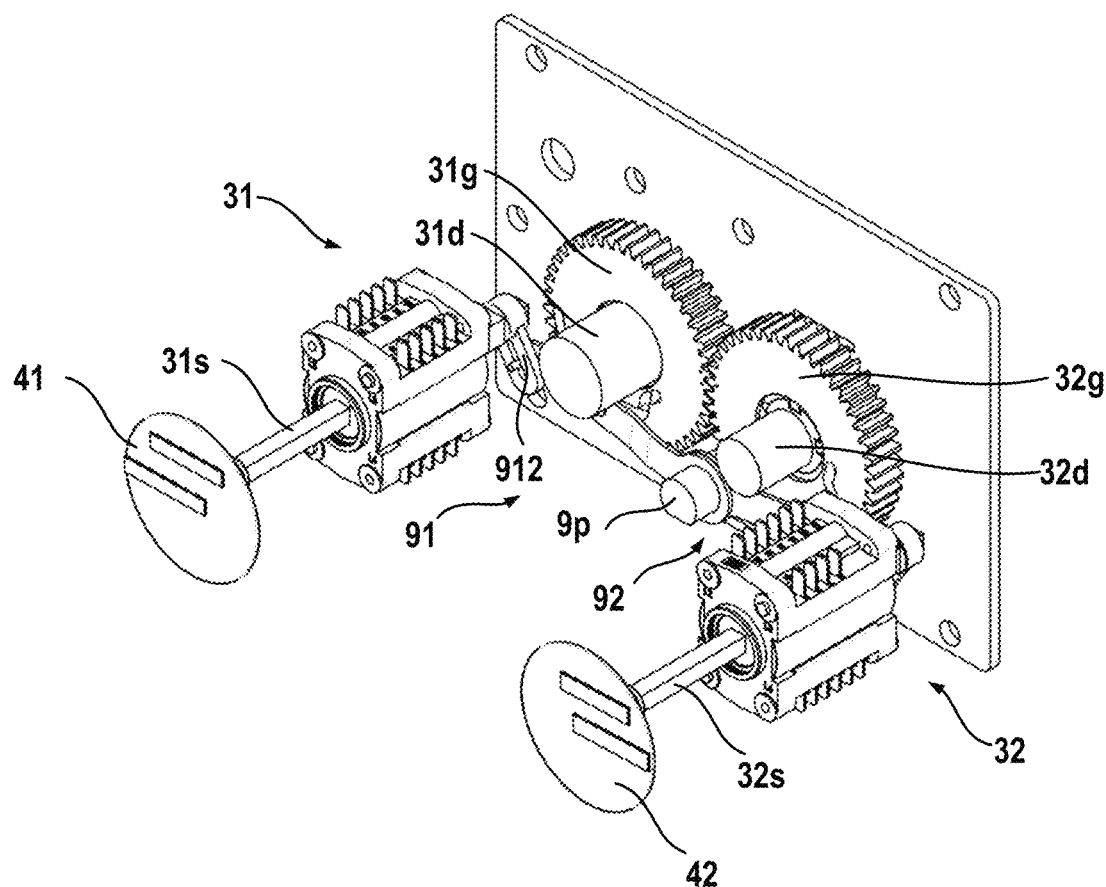
FIG. 15 is a perspective view illustrating auxiliary switches and their drive mechanisms according to an embodiment of the present disclosure.
Figure 16:
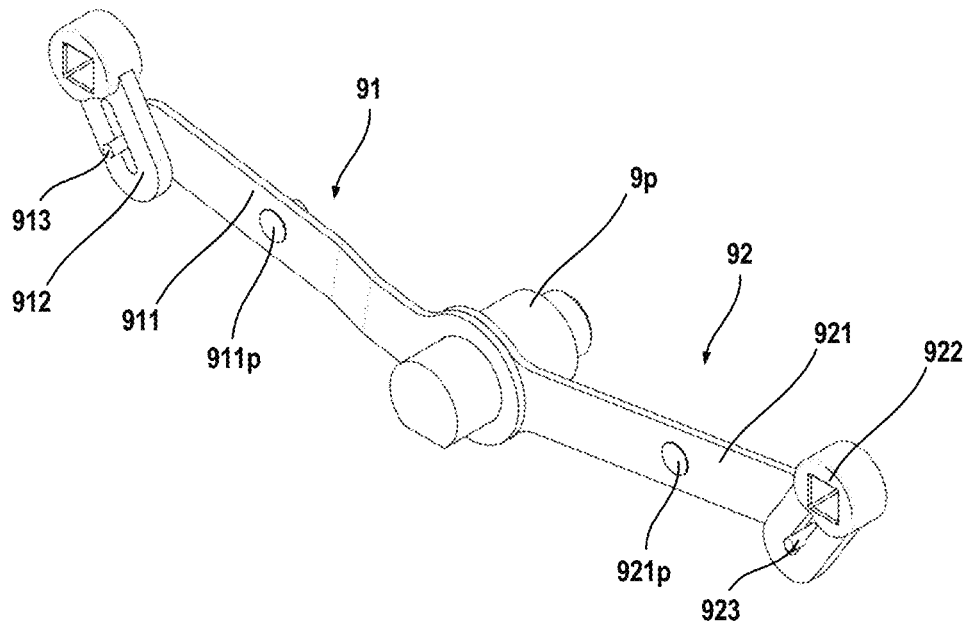
FIG. 16 is a perspective view illustrating a part of the driving mechanism according to the embodiment of the present disclosure, which shows drive links and a central pivot pin.
Figure 17:
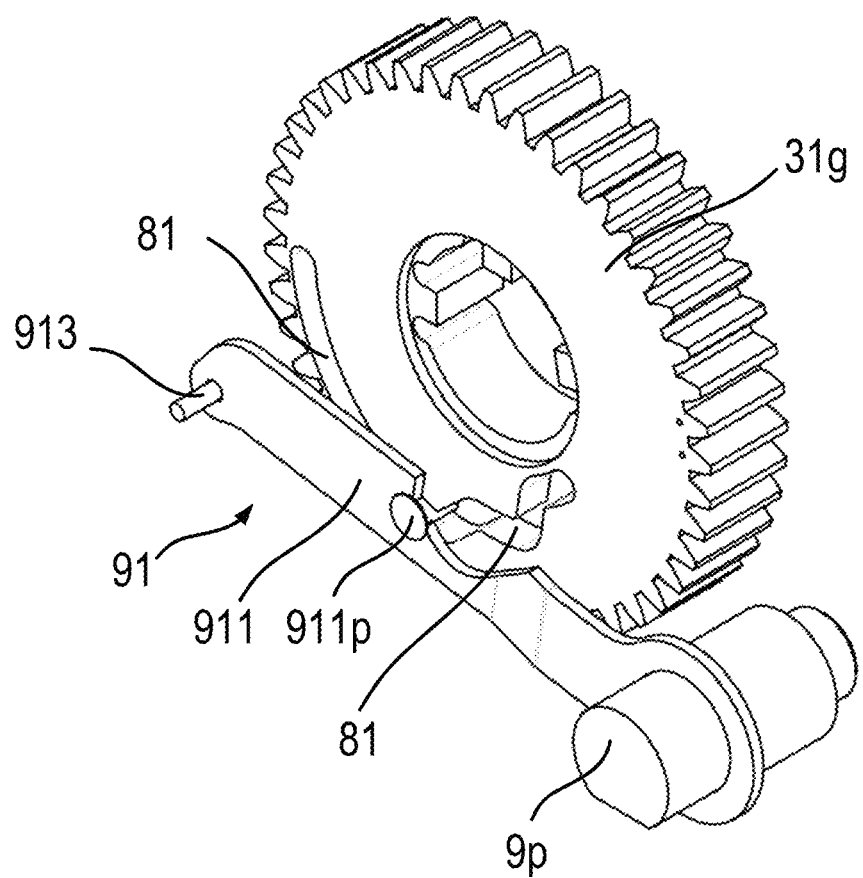
FIG. 17 is a perspective view illustrating a first drive mechanism according to the embodiment of the present disclosure.
Figure 18:
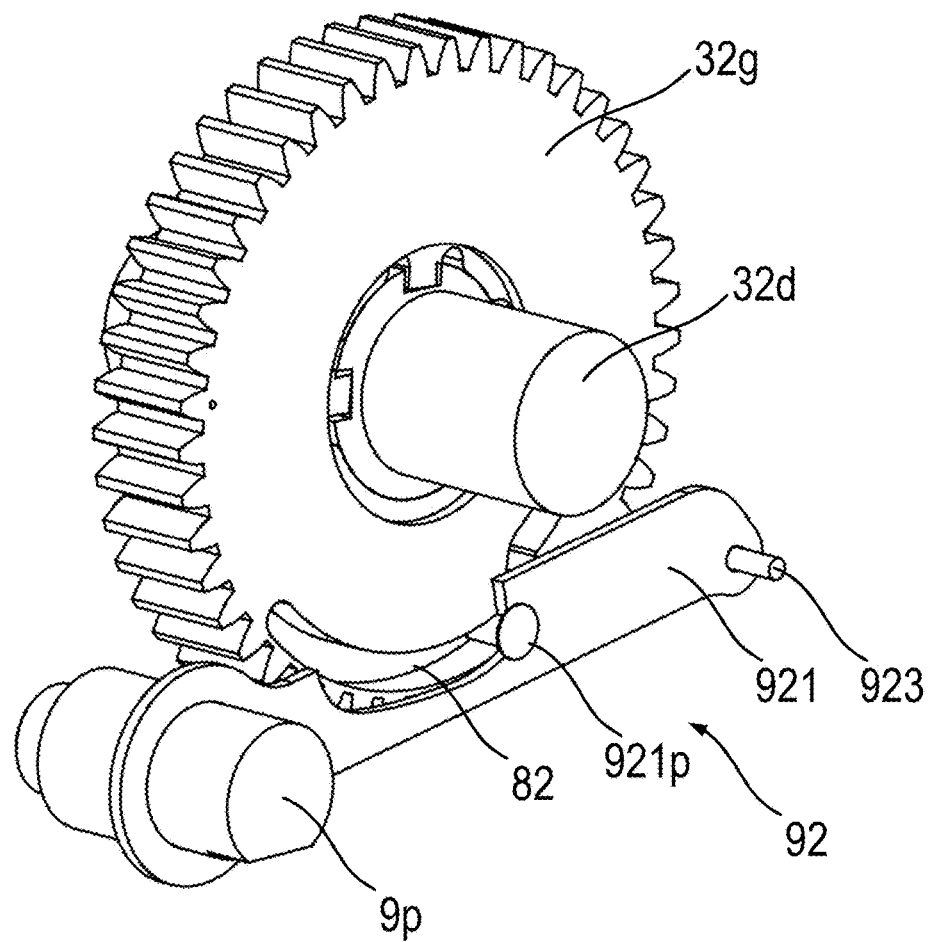
FIG. 18 is a perspective view illustrating a second drive mechanism according to the embodiment of the present disclosure.
Figure 19:
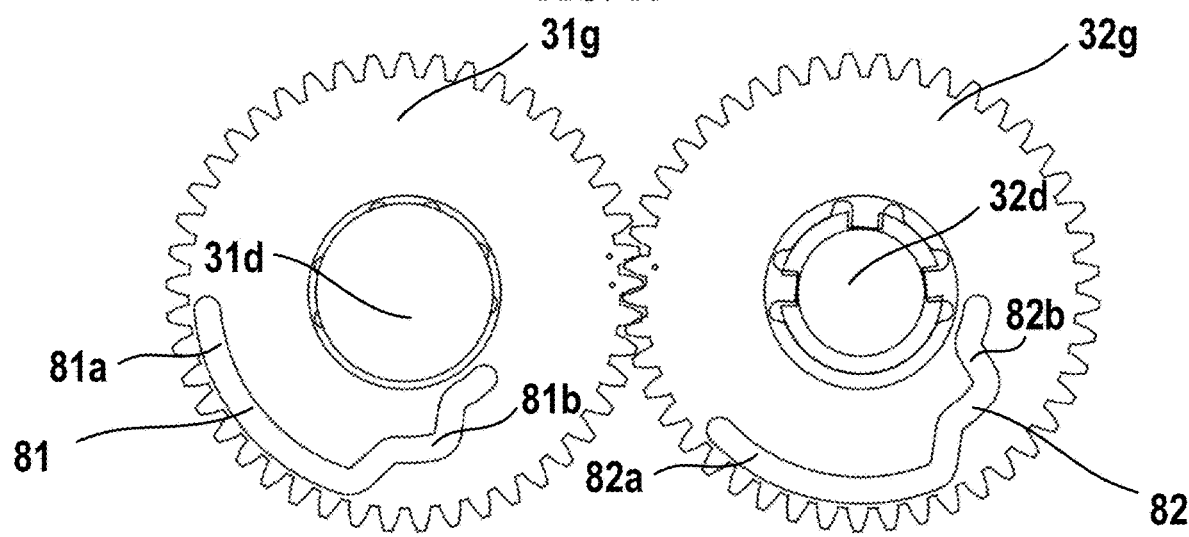
FIG. 19 is a front view illustrating a gear and a cam groove provided thereon according to the embodiment of the present disclosure.
Figure 20:
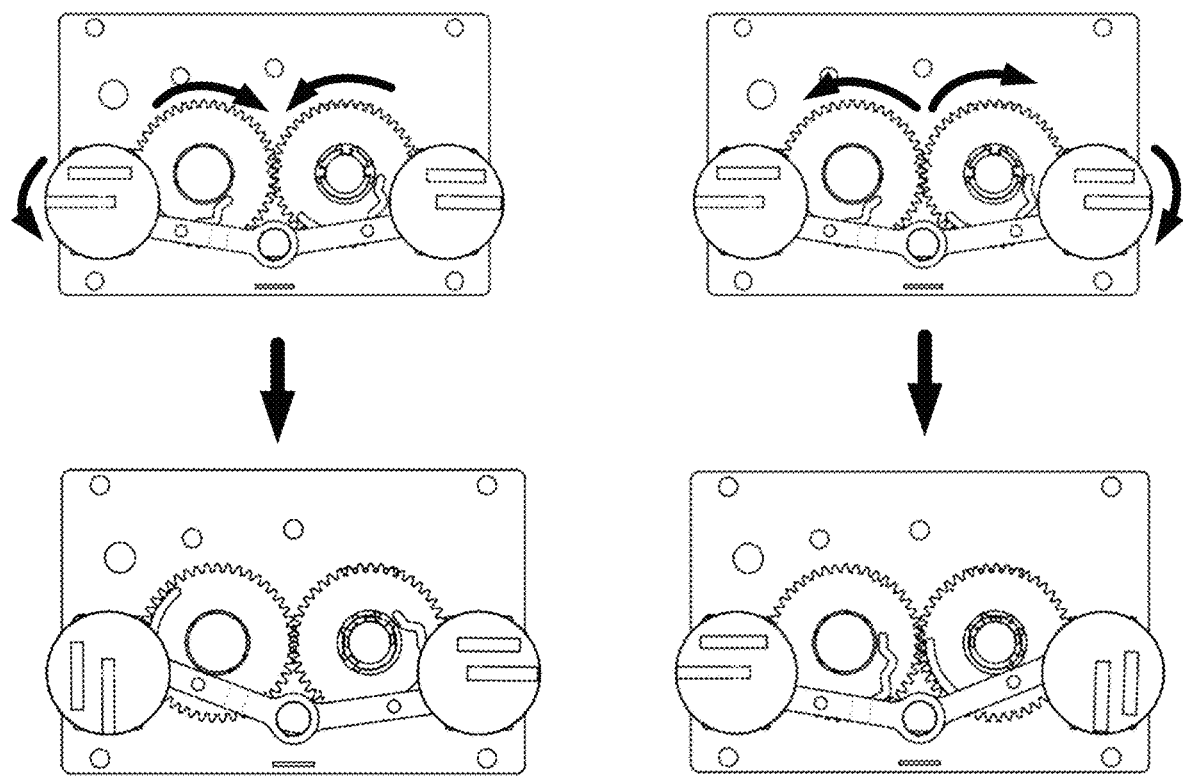
FIG. 20 is a schematic view illustrating a movement state in a case where a first auxiliary switch drive shaft and a second auxiliary switch drive shaft are respectively actuated.

FIG. 15 is a perspective view illustrating auxiliary switches 31, 32 and their drive mechanisms 31a, 32a according to an embodiment of the present disclosure. FIG. 16 is a perspective view illustrating a part of driving mechanisms 31a, 32a according to the embodiment of the present disclosure, which shows drive links 91, 92 and a central pivot pin 9p. FIG. 17 is a perspective view illustrating a first drive mechanism 31a according to an embodiment of the present disclosure. FIG. 18 is a perspective view illustrating a second drive mechanism 32a according to an embodiment of the present disclosure. FIG. 19 is a front view illustrating a gear and a cam groove provided thereon according to an embodiment of the present disclosure. FIG. 20 is a schematic view illustrating a movement state in a case where a first auxiliary switch drive shaft 31d and a second auxiliary switch drive shaft 32d are respectively actuated.

As shown in FIG. 15, the first and second three-position switches 50 and 60, specifically the first and second three-position switch operation mechanisms 50b and 60b, include a first auxiliary switch 31 and a second auxiliary switch 32, respectively. The first auxiliary switch 31 is used to implement the disconnection function, specifically, to implement an ON/OFF function of a secondary signal of a disconnection switch, whereas the second auxiliary switch 32 is used to implement the earthing function, specifically, to implement an ON/OFF function of a secondary signal of an earthing switch. When one of the first auxiliary switch 31 and the second auxiliary switch 32 is in the open state, the other of the first auxiliary switch 31 and the second auxiliary switch 32 is in the closed state. The first auxiliary switch 31 includes: a first main shaft 31s and a first indicator 41. The first indicator 41 is disposed on the first main shaft 31s and can move together with the first main shaft 31s, so as to indicate a state of the disconnection function of each of the first three-position switch 50 and the second three-position switch 60. The second auxiliary switch 32 includes: a second main shaft 32s and a second indicator 42. The second indicator 42 is disposed on the second main shaft 32s and can move together with the second main shaft 32s, so as to indicate a state of the earthing function of each of the first three-position switch 50 and the second three-position switch 60.

The drive mechanisms 31a and 32a of the auxiliary switches 31 and 32 in the embodiment of the present disclosure can be well synchronized with the indicators 41 and 42 to accurately indicate the disconnection state and the earthing state of the three-position switches. As shown in FIG. 15, the first drive mechanism 31a of the first auxiliary switch 31 includes: a first auxiliary switch drive shaft 31d, a first gear 31g and a first drive link 91. The first auxiliary switch drive shaft 31d is configured to be manually driven or driven by a motor, thereby actuating the first auxiliary switch 31. The first gear 31g is mounted on the first auxiliary switch drive shaft 31d, and is provided with a first cam groove 81. The first drive link 91 is connected between the first cam groove 81 and the first main shaft 31s, and is configured to drive the first main shaft 31s while moving along the first cam groove 81. The second drive mechanism 32a of the second auxiliary switch 32 includes a second auxiliary switch drive shaft 32d, a second gear 32g and a second drive link 92. The second auxiliary switch drive shaft 32d is configured to be manually driven or driven by a motor, thereby actuating the second auxiliary switch 32. The second gear 32g is mounted on the second auxiliary switch drive shaft 32d, and is provided with a second cam groove 82. The second drive link 92 is connected between the second cam groove 82 and the second main shaft 32s, and is configured to drive the second main shaft 32s while moving along the second cam groove 82. The first gear 31g meshes with the second gear 32g, so that when one of them is driven, the other rotates in an opposite direction. The positions of the first and second drive shafts 31d and 32d correspond to the positions of the first operation opening 61 and the second operation opening 62, respectively, so that the user may insert an operation tool into the first operation opening 61 and the second operation opening 62 to manually actuate the drive shafts 31d and 32d, respectively. In an alternative embodiment, the drive shafts 31d and 32d may be mounted to the motor so as to be driven to rotate by the motor. As only one of the first operation opening 61 and the second operation opening 62 is opened at the same time, only one of the first auxiliary switch drive shaft 31d and the second auxiliary switch drive shaft 32d can be rotated at a time.

As shown in FIGS. 15 and 16, the central pivot pin 9p is disposed between the first auxiliary switch drive shaft 31d and the second auxiliary switch drive shaft 32d, for example, disposed on a plate through which both the first auxiliary switch drive shaft 31*d* and the second auxiliary switch drive shaft 32*d* extend. As shown in FIG. 15, the central pivot pin 9*p* is disposed below the middle portion of a connection line of the first auxiliary switch drive shaft 31*d* and the second auxiliary switch drive shaft 32*d*. As shown in FIGS. 15 and 16, the first drive link 91 includes: a first link portion 911, a second link portion 912 and a pin body 911*p* disposed in the middle of the first link portion 911. One end of the first link portion 911 pivots about the central pivot pin 9*p*. The second link portion 912 is connected between the other end of the first link portion 911 and the first main shaft 31*s* of the first auxiliary switch 31. The second drive link 92 includes: a first link portion 921, a second link portion 922 and a pin body 921*p* disposed in the middle of the first link portion 921. One end of the first link portion 911 pivots around the central pivot pin 9*p*. The second link portion 922 is connected between the other end of the first link portion 921 and the second main shaft 32*s* of the second auxiliary switch 32. As shown in FIG. 16, the pin body 911*p* moves along the first cam groove 81. As shown in FIG. 17, the pin body 921*p* moves along the second cam groove 82.

As shown in FIG. 19, the first cam groove 81 and the second cam groove 82 have the same shape, but they are oriented or positioned differently relative to the respective gears 31*g* and 32*g*. For example, the first cam groove 81 includes a circular arc portion 81*a* and a bent portion 81*b*, and the second cam groove 82 also includes a circular arc portion 82*a* and a bent portion 82*b*. At the time shown in FIG. 19, the circular arc portion 81*a* of the first cam groove 81 is closer to the middle of the first gear 31*g* in the vertical direction, and the bent portion 81*b* is closer to a lower portion of the first gear 31*g* in the vertical direction, whereas the circular arc portion 82*a* of the second cam groove 82 is closer to a lower portion of the second gear 32*g* in the vertical direction, and the bent portion 82*b* is closer to the middle of the second gear 32*g* in the vertical direction. The first gear 31*g* and the second gear 32*g* mesh with each other to move synchronously, so that the first cam groove 81 and the second cam groove 82 also move synchronously. Since the first cam groove 81 and the second cam groove 82 are oriented differently, the position of the pin 911*p* relative to the first cam groove 81 and the position of the pin 921*p* relative to the second cam groove 82 are different at the same time. Therefore, during the movement, since the links 91 and 92 with the pin 911*p* and the pin 921*p* act to drive the first main shaft 31*s* and the second main shaft 32*s*, the position of the first cam groove 81 relative to the first main shaft 31*s* and the position of the second cam groove 82 relative to the second main shaft 32*s* are different at the same time.

The movement process will be described below in more detail with reference to FIG. 20. As shown on the left side of FIG. 20, the first auxiliary switch drive shaft 31*d* is actuated, for example, manually actuated or actuated by a motor to rotate clockwise, then the first gear 31*g* rotates clockwise, and the second gear 32*g* rotates counterclockwise at this time. In the movement process, the pin 911*p* moves counterclockwise along the bent portion 81*b* of the first cam groove 81, and the pin 921*p* moves clockwise along the circular arc portion 82*a* of the second cam groove 82. Upon completion of the movement process, as shown in the left lower view of FIG. 20, for example, the pin 911*p* moves in the counterclockwise direction to the right side of the bent portion 81*b*, and the pin 921*p* moves in the clockwise direction to the left side of the arc portion 82*a*. Then, at this time, the first indicator 41 will be converted while the second indicator 42 will remain not converted. At this time, the first indicator 41 can accurately and synchronously indicate that the first auxiliary switch drive shaft 31*d* is driven, and the disconnection function of the three-position switch is operated. In other words, precise synchronization is achieved between the first auxiliary switch 31 and the first drive mechanism 31*a*.

Furthermore, as shown on the right side of FIG. 20, the second auxiliary switch drive shaft 32*d* is actuated, for example, manually actuated or actuated by a motor to rotate clockwise, whereupon the second gear 32*g* rotates clockwise, and the first gear 31*g* rotates counterclockwise. In the movement process, the pin 921*p* moves counterclockwise along the bent portion 82*b* of the second cam groove 82, and the pin 911*p* moves clockwise along the circular arc portion 81*a* of the first cam groove 81. Upon completion of the movement process, as shown in the right lower view of FIG. 20, for example, the pin 921*p* moves in the clockwise direction to the right side of the bent portion 82*b*, and the pin 911*p* moves in the counterclockwise direction to the left side of the circular arc portion 81*a*. At this time, the second indicator 42 will be converted, whereas the first indicator 41 will remain not converted. At this time, the second indicator 42 can accurately and synchronously indicate that the second auxiliary switch drive shaft 32*d* is driven, and the earthing function of the three-position switch is operated. In other words, precise synchronization is achieved between the second auxiliary switch 32 and the second drive mechanism 32*a*.

Without prejudice to the basic principles, details and embodiments can vary relative to the content described only by way of examples, or even vary significantly, without departing from the scope of protection.

The various embodiments described above can be combined to provide further embodiments. Aspects of the embodiments can be modified, if necessary to employ concepts of the various patents, applications and publications to provide yet further embodiments.

These and other changes can be made to the embodiments based on the above detailed description. In general, in the following claims, the terms used should not be construed to limit the invention to the specific embodiments disclosed in the specification and the claims, but should be construed as all the scope including all possible embodiments and equivalents endowing the claims. Hence, the claims are not limited by the disclosed content.

We claim:

1. A switch device, comprising:
    a first three-position switch;
    a second three-position switch disposed below the first three-position switch;
    a circuit breaker disposed between and coupled to the first three-position switch and the second three-position switch, wherein the first three-position switch is configured to implement bus coupling, and the second three-position switch is configured to implement bus rising;
    a first interlock unit disposed above the circuit breaker and coupled to the circuit breaker and the first three-position switch, and configured to block a manual operation of the first three-position switch in a closed state of the circuit breaker, and configured to block a manual closing operation of the circuit breaker while the first three-position switch is manually operated in an open state of the circuit breaker; and
    a second interlock unit disposed below the circuit breaker and coupled to the circuit breaker and the second three-position switch, and configured to block a manual operation of the second three-position switch in the closed state of the circuit breaker, and configured to block a manual closing operation of the circuit breaker while the second three-position switch is manually operated in the open state of the circuit breaker, wherein the first interlock unit and the second interlock unit are respectively configured to switch between a locked position and a released position, wherein at the locked position, the manual operation of the first three-position switch and the second three-position switch is not allowed, and at the released position, the manual operation of the first three-position switch and the second three-position switch is allowed, and the circuit breaker comprises a rotatable main shaft, the first interlock unit and the second interlock unit are each selectively engaged with the rotatable main shaft, and are respectively configured to: when the circuit breaker is closed, the first interlock unit and the second interlock unit are locked by the rotatable main shaft to be at the locked position to block the manual operation of the first three-position switch and the second three-position switch, and when the circuit breaker is opened, the first interlock unit and the second interlock unit are released by the rotatable main shaft to be at the released position to allow the manual operation of the first three-position switch and the second three-position switch.

2. The switch device according to claim 1, wherein each of the first three-position switch and the second three-position switch comprises: a first operation opening configured to permit manual implementation of a disconnection operation; a second operation opening configured to permit manual implementation of an earthing operation; and an access cover configured to be capable of being actuated to switch between a first position and a second position, where at the first position, the access cover covers both the first operation opening and the second operation opening, and at the second position, the access cover opens one of the first operation opening wand the second operation opening.

3. The switch device according to claim 2, wherein the first interlock unit comprises a first transmission mechanism, the second interlock unit comprises a second transmission mechanism, and the first transmission mechanism and the second transmission mechanism are connected to the corresponding access cover and capable of moving synchronously with the corresponding access cover, the first transmission mechanism and the second transmission mechanism are respectively configured to: be locked when the circuit breaker is closed, so that the access cover cannot be switched to the second position; and be released when the circuit breaker is opened, and be actuated while the access cover is switched to the second position, so that the circuit breaker cannot be closed.

4. The switch device according to claim 3, wherein the first three-position switch further comprises a first access cover rotating shaft, the access cover of the first three-position switch is fixedly mounted on the first access cover rotating shaft, and the first access cover rotating shaft is configured to be capable of being rotated so that the access cover of the first three-position switch is switched between the first position and the second position, the first transmission mechanism of the first interlock unit comprises: a first link mechanism coupled to the first access cover rotating shaft and including a vertical extension, and configured to move synchronously with the first access cover rotating shaft; and a pivotable link configured to be capable of pivoting about an axis under actuation of the first link mechanism.

5. The switch device according to claim 4, wherein a first bi-link is fixedly provided on the rotatable main shaft, and the first bi-link comprises two links spaced apart from each other by a certain space, wherein the first bi-link is configured to: limit the vertical extension between the two links when the circuit breaker is closed, so that the first link mechanism cannot move, and thus the access cover of the first three-position switch cannot be switched to the second position, and release the vertical extension when the circuit breaker is opened, so that the access cover of the first three-position switch can be moved to the second position and the first link mechanism can move to actuate the pivotable link to pivot about the axis.

6. The switch device according to claim 5, wherein the circuit breaker comprises a closing button, and the first interlock unit further comprises a first linkage mechanism linked with the closing button, and the first linkage mechanism is configured to be capable of being engaged with the pivotable link when the circuit breaker is opened, so that the closing button cannot be pressed.

7. The switch device according to claim 6, wherein the first link mechanism comprises: a lever having a first end fixedly coupled to the access cover rotating shaft to swing under the rotation actuation of the access cover rotating shaft; a first fixed pin fixedly disposed in the switch device; and a first slider supported by the first fixed pin and including the vertical extensions, the first slider accommodating a second end of the lever and configured to slide horizontally along the first fixed pin as the lever swings.

8. The switch device according to claim 7, wherein the first slider comprises an elongated slot and a V-shaped slot, and the first fixed pin is located in the elongated slot, and a first end of the pivotable link is engaged with the V-shaped slot, when the access cover of the first three-position switch is at the first position, the first fixed pin is located in the middle portion of the elongated slot, and the first end of the pivotable link is located in the middle portion of the V-shaped slot, and the second end of the pivotable link is not engaged with the first linkage mechanism, when the access cover of the first three-position switch is at the second position, the first fixed pin is located at an end of the elongated slot, and the first end of the pivotable link is located at an end of the V-shaped slot and is actuated by the end of the V-shaped slot to pivot the second end of the pivotable link into engagement with the first linkage mechanism.

9. The switch device according to claim 5, wherein the second three-position switch further comprises a second access cover rotating shaft, the access cover of the second three-position switch is fixedly mounted on the second access cover rotating shaft, and the second access cover rotating shaft is configured to be capable of being rotated so that the access cover of the second three-position switch is switchable between the first position and the second position;

the second transmission mechanism of the second interlock unit comprises: a pull wire coupled to the second access cover rotating shaft and configured to be pulled down under the rotation actuation of the second access cover rotating shaft, and a second link mechanism coupled to the pull wire and configured to be movable in the vertical direction.

10. The switch device according to claim 9, wherein a second bi-link is fixedly provided on the rotatable main shaft, and the second bi-link is spaced apart from the first bi-link, wherein the second bi-link is configured to: when the circuit breaker is closed, engage with and lock the second link mechanism so that it cannot move vertically, so that the pull wire cannot be pulled down and the access cover of the second three-position switch cannot be switched to the second position; and when the circuit breaker is opened, release the second link mechanism so that the access cover of the second three-position switch can move to the second position, and the second link mechanism can move.

11. The switch device according to claim 10, wherein the circuit breaker comprises a closing button, and the second interlock unit further comprises a second linkage mechanism linked with the closing button, and the second linkage mechanism is configured to be engaged with the second link mechanism when the circuit breaker is opened so that the closing button cannot be pressed.

12. The switch device according to claim 11, wherein the second link mechanism comprises a first portion, a second portion and a third portion, and the first portion and the third portion are respectively connected to both ends of the second portion, the second portion is configured to pivot around a second fixed pin at the middle thereof, so that the first portion and the third portion are simultaneously locked, or so that when one of the first portion and the third portion moves upward, the other one moves downward, the third portion is configured to: be locked when the circuit breaker is closed so that the first portion is also locked, and be released when the circuit breaker is opened, so that the first portion can move in a direction opposite to the third portion.

13. The switch device according to claim 12, wherein the third portion comprises a slot, and the slot accommodates a third fixed pin so that the third portion can slide up and down along the third fixed pin, when the circuit breaker is closed to cause the second bi-link to move upward, the second bi-link is engaged with an upper end of the third portion, and an upper end of the slot is engaged with the third fixed pin to limit movement of the third portion in the vertical direction, when the circuit breaker is opened to cause the second bi-link to move upwards, the second bi-link releases the upper end of the third portion so that the first portion can move downward under the pull of the pull wire, and meanwhile the third portion can move upward.

14. The switch device according to claim 12, wherein the first portion comprises: a vertical plate having a lower end coupled to an end of the second portion opposite to the third portion and coupled to the pull wire, and a second slider coupled to an upper end of the vertical plate and having an upper end provided with a groove; at an end of a downward movement stroke of the first portion, the first portion is engaged with the second linkage mechanism through an upper end of the groove.

15. The switch device according to claim 1, wherein each of the first three-position switch and the second three-position switch comprises: a first auxiliary switch for implementing a disconnection function; a second auxiliary switch for implementing an earthing function; wherein when one of the first auxiliary switch and the second auxiliary switch is in an open state, the other one of the first auxiliary switch and the second auxiliary switch is in a closed state.

16. A switch device, comprising:
a first three-position switch;
a second three-position switch disposed below the first three-position switch;
a circuit breaker disposed between and coupled to the first three-position switch and the second three-position switch;
a first interlock unit disposed above the circuit breaker and coupled to the circuit breaker and the first three-position switch, and configured to block a manual operation of the first three-position switch in a closed state of the circuit breaker, and configured to block a manual closing operation of the circuit breaker while the first three-position switch is manually operated in an open state of the circuit breaker; and
a second interlock unit disposed below the circuit breaker and coupled to the circuit breaker and the second three-position switch, and configured to block a manual operation of the second three-position switch in the closed state of the circuit breaker, and configured to block a manual closing operation of the circuit breaker while the second three-position switch is manually operated in the open state of the circuit breaker, wherein each of the first three-position switch and the second three-position switch comprises:
a first auxiliary switch for implementing a disconnection function;
a second auxiliary switch for implementing an earthing function;
wherein when one of the first auxiliary switch and the second auxiliary switch is in an open state, the other one of the first auxiliary switch and the second auxiliary switch is in a closed state, wherein the first auxiliary switch comprises: a first main shaft, and a first indicator disposed on the first main shaft and being movable together with the first main shaft to indicate a state of the disconnection function of each of the first three-position switch and the second three-position switch;
the second auxiliary switch comprises: a second main shaft, and a second indicator disposed on the second main shaft and being movable together with the second main shaft to indicate a state of the earthing function of each of the first three-position switch and the second three-position switch.

17. The switch device according to claim 16, further comprising:
a first drive mechanism including a first cam groove and configured to drive the first main shaft to rotate;
a second drive mechanism including a second cam groove and configured to drive the second main shaft to rotate;
wherein the second cam groove and the first cam groove are configured to move synchronously, and are oriented in such a way that at the same time, a position of the first cam groove relative to the first main shaft is different from a position of the second cam groove relative to the second main shaft.

18. The switch device according to claim 17, wherein the first drive mechanism further comprises:
a first auxiliary switch drive shaft configured to actuate the first auxiliary switch;
a first gear which is mounted on the first auxiliary switch drive shaft and on which the first cam groove is provided; and
a first drive link coupled between the first cam groove and the first main shaft and configured to drive the first main shaft while moving along the first cam groove; and
the second drive mechanism further comprises:
a second auxiliary switch drive shaft configured to actuate the second auxiliary switch;
a second gear which is mounted on the second auxiliary switch drive shaft and meshes with the first gear and on which the second cam groove is provided; and a second drive link coupled between the second cam groove and the second main shaft and configured to drive the second main shaft while moving along the second cam groove.

19. The switch device according to claim 17, wherein each of the first three-position switch and the second three-position switch further comprises:
- a central pivot pin disposed between the first auxiliary switch drive shaft and the second auxiliary switch drive shaft;
- each of the first drive link and the second drive link comprises:
  - a first link portion having an end pivoting around the central pivot pin, and
  - a second link portion connected between the other end of the first link portion and the main shaft of the corresponding auxiliary switch, wherein a pin body is disposed in the middle portion of the first link portion, and moves along the corresponding cam groove, so that at the same time, a position of the first drive link relative to the first cam groove is different from a position of the second drive link relative to the second cam groove.

* * * * *